United States Patent [19]

Schneider et al.

[11] 4,082,665
[45] Apr. 4, 1978

[54] FLUID FILTER DEVICE FOR AUTOMOTIVE POWER STEERING SYSTEM

[76] Inventors: Manuel Schneider, 231 Beach 131 St., Belle Harbor, N.Y. 11694; Emil J. Novak, 111 Stewart Ave. West, Garden City, N.Y. 11530

[21] Appl. No.: 701,818

[22] Filed: Jul. 1, 1976

[51] Int. Cl.² .............................................. B01D 27/10
[52] U.S. Cl. ........................................ 210/91; 210/94; 210/132; 210/167; 210/222; 210/446; 60/454
[58] Field of Search ................. 210/98, 131, 132, 167, 210/168, 429, 446, 448, 130, 222, 91, 94, 223; 60/453, 454

[56] References Cited

U.S. PATENT DOCUMENTS

| | | | |
|---|---|---|---|
| 2,793,752 | 5/1957 | Jay | 210/448 X |
| 3,334,747 | 8/1967 | Niccum et al. | 210/130 |
| 3,467,256 | 9/1969 | Humbeat et al. | 210/132 |
| 3,795,312 | 3/1974 | Lawson | 210/167 |
| 3,945,208 | 3/1976 | O'Connor | 60/453 X |

*Primary Examiner*—John Adee

[57] ABSTRACT

In a fluid filter device particularly suited for installation in an automotive power steering system, a cylindrical filter element which is axially movable in a casing having inlet and outlet passages at its opposite ends includes a foraminous side wall constituting a primary filter and a valve member at one end of the filter element normally urged to engage a seat about the opening of the inlet passage by a spring acting on the filter element so that, when the primary filter becomes clogged, the buildup of the differential pressure between the inlet and outlet passages causes axial movement of the filter element for unseating the valve member and permitting the fluid to bypass the primary filter through an annular clearance between the latter and the casing wall, and a secondary filter annulus extends from the filter element across such annular clearance for filtering the fluid which bypasses the primary filter. Further, the casing wall is preferably provided with a cavity having filtered openings to the annular clearance at the down-stream side of the secondary filter annulus, and at least one bypass passage in the casing wall extending to the cavity from a port which is normally closed by the secondary filter annulus so that such port is opened to permit continued flow of filtered fluid to the annular clearance by way of the filtered openings of the cavity only when the secondary filter annulus becomes clogged to cause further axial movement of the filter element.

26 Claims, 6 Drawing Figures

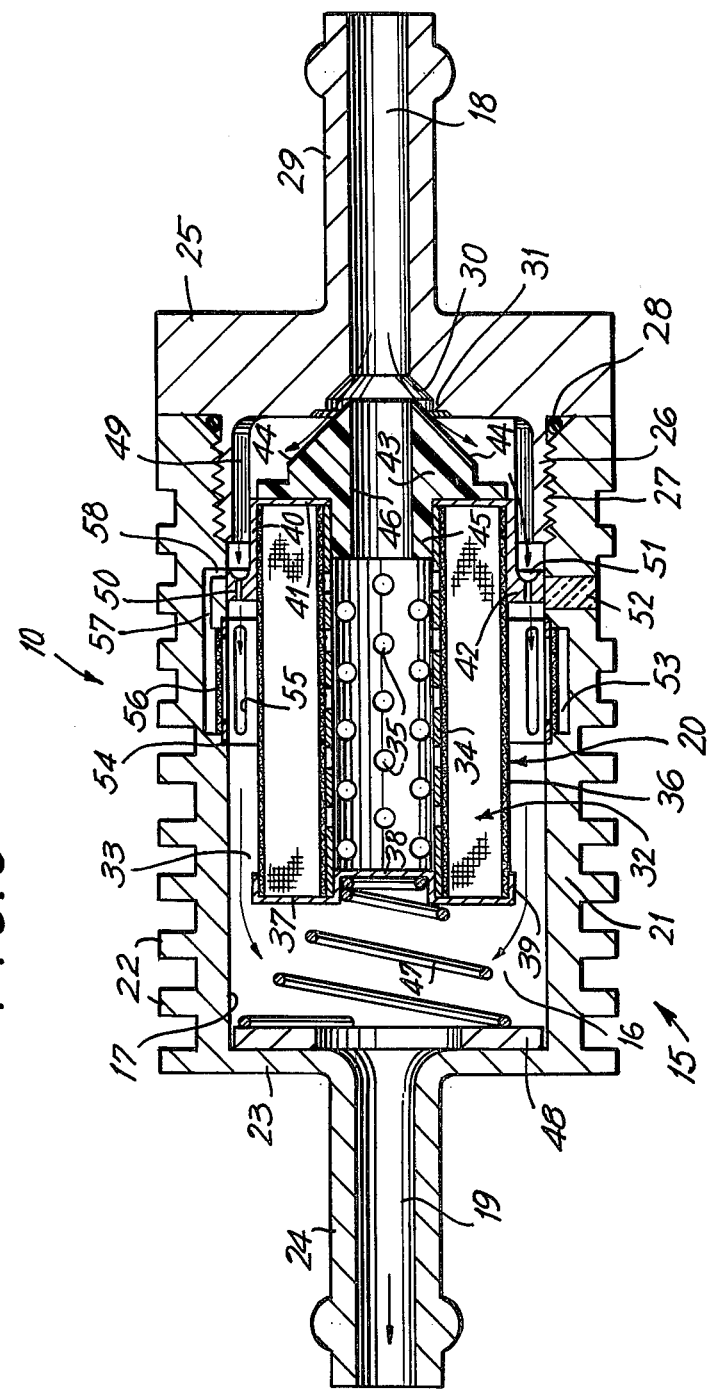

FLUID FILTER DEVICE FOR AUTOMOTIVE POWER STEERING SYSTEM

BACKGROUND OF THE INVENTION

1. Field of the Invention

This invention relates generally to fluid filters, and more particularly is directed to a fluid filter device especially suited for installation in an automotive power steering system.

2. Background of the Invention

Many modern automotive vehicles are provided with power steering systems. In such power steering systems, a power steering pump driven by the engine of the vehicle is connected through pressure and return lines or hoses with a power steering gear for circulating hydraulic fluid under pressure through the latter, and such power steering gear has valves controllable in response to manipulation of the steering wheel for directing the flow of fluid under pressure so as to provide a substantial portion of the force required for the steering of the vehicle. Since the valves and other mechanisms of the power steering gear are manufactured with very close tolerances and small clearances in order to properly perform their respective functions, the presence of metal, sand or other small particles, such as are detached from the interior surfaces of the pressure and return hoses when the latter deteriorate, in the hydraulic fluid being circulated can cause serious damage to the power steering gear and/or pump, and more particularly can cause the valves of the power steering gear to lock or stick briefly in positions other than those required for proper steering of the vehicle. It has been found that many serious automobile accidents resulting from swerving of an automobile out of its designated lane have been caused by power steering failures attributed to metal, sand or other particles or contaminants contained in the circulated hydraulic fluid of the power steering system and producing the described locking, sticking or even "self-steering" thereof.

In many existing power steering systems, the only protection against the above described hazard is in the form of a filter constituted by a single disk of metal mesh or screening extending across the interior of a casing which is usually interposed in the return line or hose. Apart from the inadequacy of such disk of metal mesh or screening in achieving full filtration of all particles and contaminants from the circulated hydraulic fluid, it will be apparent that, when the disk of metal mesh or screening becomes clogged with particles that have been filtered from the hydraulic fluid, the circulation of fluid between the power steering pump and the power steering gear is positively blocked with the result that operation of the power steering system is arrested without prior warning to the driver at a time when the power assist for steering may be most urgently required.

Although not particularly intended for use in automotive power steering systems, filter devices have been provided, for example, as disclosed in U.S. Pat. Nos. 2,389,814 and 3,334,747, in which a tubular filter element is disposed within a cylindrical casing having inlet and outlet passages at its opposite ends so that the fluid is normally passed radially through the wall of the filter element, and further in which a bypass valve is normally closed by a spring but is opened in response to the increase in the pressure differential between the inlet and outlet passages when the filter element is clogged so as to bypass the latter and ensure a continued flow of fluid through the device. However, in such existing filter devices which bypass the filter element when the latter is clogged, the bypass flow of fluid is unfiltered. Thus, if such a filter device was installed in a power steering sytem, the clogging of the filter element, for example, as a result of serious contamination of the hydraulic fluid with foreign particles, would cause such contaminated hydraulic fluid to be circulated, without any filtration thereof, through the power steering gear following the opening of the bypass valve so as to again create the hazard of a catastrophic malfunction of the power steering gear. Moreover, in the existing filter devices provided with a bypass valve, as described above, the flow rate past the valve, when the latter is opened in response to clogging of the filter element, is not appreciably different from the normal flow rate through the filter element so that, if such a filter device is installed in an automotive power steering system, the opening of the bypass valve in response to clogging of the filter element is not indicated to the driver as a detectable decrease in the power assist of the steering system. Further, in the existing filter devices provided with a bypass valve, the surface area against which the pressure differential acts for opening the valve is not appreciably greater when the valve is in its opened condition than when the valve is closed with the result that, following clogging of the filter element, there is a tendency for the valve to fluctuate between its fully opened position and an at least partially closed position to produce a corresponding undesirable fluctuating rate of flow of the fluid through the power steering gear.

OBJECTS AND SUMMARY OF THE INVENTION

Accordingly, it is an object of this invention to provide a fluid filter device which is free of the above described problems associated with existing fluid filter devices so as to be particularly suited for use in automotive power steering systems.

More particularly, an object of this invention is to provide a fluid filter device having a primary filter for normally effecting efficient filtration of the fluid until such time as the primary filter is clogged, whereupon the fluid is made to bypass the primary filter and is subjected to a secondary filtration.

Another object is to provide a fluid filter device, as aforesaid, in which, upon clogging of the secondary filter as well as the primary filter, the fluid is further bypassed through a tertiary filter so as to maintain the flow of filtered fluid through the device.

Still another object is to provide an automotive power steering system with a fluid filter device which may be conveniently interposed in a line or hose carrying the fluid between the power steering pump and power steering gear of such system for efficiently removing foreign particles and contaminants from the hydraulic fluid circulated in such system.

Still another object is to provide a fluid filter device for a power steering system, as aforesaid, having a primary filter for efficient normal filtration of the fluid, and a normally closed bypass valve which is opened in response to clogging of the primary filter so as to bypass the fluid about such primary filter through a secondary filter, with the rate of flow of the fluid, when bypassing the primary filter, being substantially reduced relative to the normal rate of flow of fluid through the primary filter so as to be detectable by the driver as a decreased power assist for the steering system, whereby to alert the driver to the necessity for repair or servicing of the power steering system.

A still further object of the invention is to provide a fluid filter device for a power steering system, as aforesaid, in which the surface area against which the fluid pressure acts for maintaining the bypass valve in its opened position is greater than the surface area against which the fluid pressure acts for displacing the bypass valve from its closed position so that, upon clogging of the primary filter, the bypass valve is reliably held in its opened position for maintaining a uniform reduced rate of flow of filtered fluid through the device.

In a fluid filter device according to a preferred embodiment of this invention and which is particularly suited for installation in an automotive power steering system, a cylindrical filter element which is axially movable in a casing having inlet and outlet passages at its opposite ends includes a foraminous side wall constituting a primary filter and a valve member at one end of the filter element normally urged to engage a seat about the opening of the inlet passage by a spring acting on the filter element so that, when the primary filter becomes clogged, the buildup of the differential pressure between the inlet and outlet passages causes axial movement of the filter element for unseating the valve member and permitting the fluid to bypass the primary filter through an annular clearance between the latter and the casing wall, and a secondary filter annulus extends from the filter element across such annular clearance for filtering the fluid which bypasses the primary filter. Further, it is a feature of this invention to provide the casing wall of the foregoing fluid filter device with a cavity having filtered openings to the annular clearance at the downstream side of the secondary filter annulus, and with at least one bypass passage in the casing wall extending to the cavity from a port which is normally closed by the secondary filter annulus so that such port is opened to permit continued flow of filtered fluid to the annular clearance by way of the filtered openings of the cavity only when the secondary filter annulus also becomes clogged to cause further axial movement of the filter element within the casing.

The above, and other objects, features and advantages of the invention, will be apparent in the following detailed description of an illustrative embodiment of the invention which is to be read in connection with the accompanying drawings.

BRIEF DESCRIPTION OF THE DRAWINGS

FIG. 5 is a sectional view similar to that of FIG. 2, but showing the fluid filter device in the condition thereof following clogging of its primary filter.

DESCRIPTION OF A PREFERRED EMBODIMENT

Figure 1:
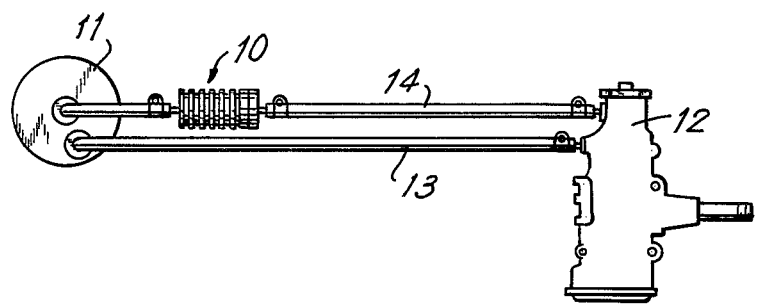
FIG. 1 is a schematic view of a portion of an automotive power steering system provided with a fluid filter device in accordance with an embodiment of this invention.

Referring to the drawings in detail, and initially to FIG. 1 thereof, it will be seen that a fluid filter device 10 according to this invention is particularly suited for use in an otherwise conventional automotive power steering system having a power steering pump 11 suitably driven by the engine of the vehicle, a power steering gear 12, and pressure and return lines 13 and 14 extending between the power steering pump and gear 11 and 12 for circulating hydraulic fluid therebetween, with the fluid filter device 10 being preferably interposed in the return line or hose 14.

Figure 2:
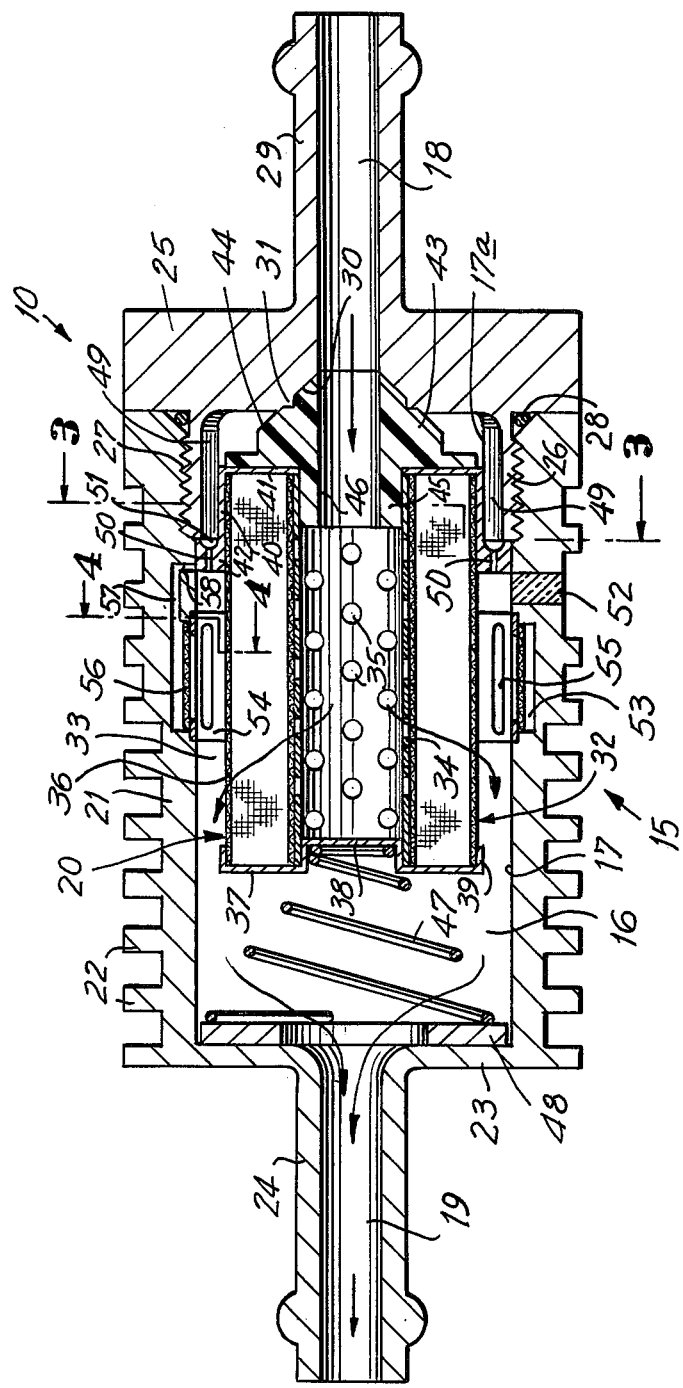
FIG. 2 is an enlarged axial sectional view of the fluid filter device according to this invention, and which is shown in its normal operating condition.

As shown particularly on FIG. 2, the fluid filter device 10 according to an embodiment of this invention generally comprises a casing 15 defining a chamber 16 with a cylindrical wall surface 17 and having axial inlet and outlet passages 18 and 19 communicating with chamber 16 at the opposite ends of the latter, and an elongated filter element 20 which is axially movable in chamber 16.

Figure 6:
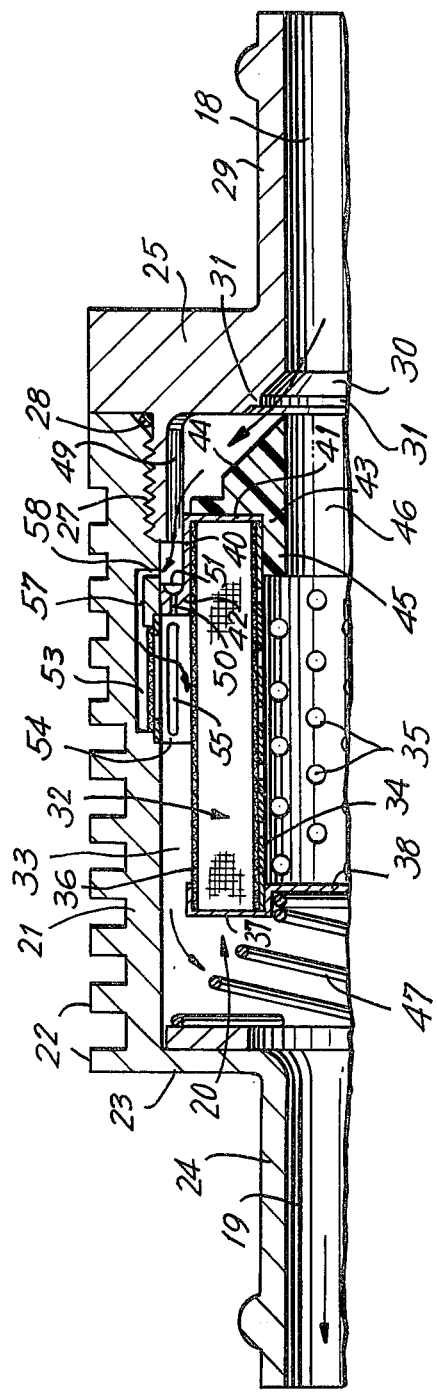
FIG. 6 is a fragmentary sectional view corresponding to a portion of FIGS. 2 and 5, but showing the fluid filter device in the condition thereof following clogging of both the primary and secondary filters.

In the fluid filter device 10, as shown, the casing 15 includes a generally cylindrical body having a side wall 21 with fins 22 extending from its outer surface for promoting the dissipation of heat from the fluid flowing through device 10, and an end wall 23 at one end of cylindrical side wall 21 provided with a nipple 24 projecting axially from its center for defining outlet passage 19. The illustrated casing 15 is further shown to include a circular cap or closure 25 having an annular flange or wall portion 26 directed axially from one side of cap 25 and being provided with threads on its outer surface for threaded engagement, as at 27, with corresponding internal threads formed in the end portion of cylindrical wall 21 remote from end wall 23. A sealing ring 28 of rubber or the like extends around annular wall 26 adjacent cap 25 so as to be engageable by an end surface of wall 21 for sealing the joint between wall 21 and cap 25. Since the internal diameter of annular wall 26 is smaller than that of cylindrical wall 21, it will be apparent that annular wall 26, when threadably engaged with wall 21, defines a reduced diameter end portion 17a for the wall surface 17 of chamber 16. The cap 25 is further shown to have a nipple 29 projecting axially from the center of cap 25 at the side of the latter remote from annular wall 26 for defining inlet passage 18. As shown particularly on FIGS. 5 and 6, at the side of cap 25 facing into chamber 16, cap 25 is formed with a frusto-conical valve seat 30 extending about the opening of inlet passage 18 into chamber 16. Such frusto-conical valve seat 30 preferably has an annular, relatively sharp-edged ridge 31 projecting therefrom.

In the illustrated fluid filter device 10 according to this invention, the elongated filter element 20 is shown to include a foraminous cylindrical side wall 32 constituting a primary filter and being spaced from the wall surface 17 of chamber 16 to provide an annular clearance 33 therebetween which communicates with outlet passage 19. As shown, the foraminous side wall 32 of element 20 is desirably comprised of an elongated tube 34 having perforations 35 distributed therein, and a filtering medium in the form of a fine wire mesh or screen 36 which is arranged in corrugations about perforated tube 34, as particularly shown on FIGS. 3 and 4, so as to provide a large effective area for normal filtration of the fluid. An end wall 37 is formed with a central, circular depression 38 which fits into the adjacent end of tube 34, and the outer periphery of end wall 37 is formed with a flange 39 which embraces the adjacent end portion of the corrugated filter screen or mesh 36 (FIG. 2). At the end of filter element 20 remote from end wall 37, filter element 20 is provided with a cylindrical wall 40 which extends around the adjacent end portion of corrugated filter screen or mesh 36 and which is formed with a radially inwardly directed flange 41 extending to the adjacent end of tube 34. The outer surface of cylindrical wall 40 is diametrically dimensioned to slidably engage the guide surface 17a so that the latter will guide filter element 20 in its axial movement within casing 15. Further, the end of cylindrical wall 40 remote from inwardly directed flange 41 is provided with an outwardly directed flange or annulus 42 which, at its outer periphery, slidably engages wall surface 17 of chamber 16.

A valve member 43 is fixed at the end of filter element 20 directed toward inlet passage 18 and is formed with a frusto-conical surface 44 (FIGS. 2, 5 and 6) which is adapted to engage the similarly shaped valve seat 30. Valve member 43 has an annular boss 45 extending therefrom for frictional retention within the adjacent end of tube 34, and further has an axial bore 46 which communicates with inlet passage 18 when valve member 44 engages seat 30, as shown on FIG. 2. The valve member 43 is preferably molded or otherwise formed of a plastic resin, such as, for example, polytetrafluoroethylene, so that, when valve member 43 engages seat 30, the sharp-edged annular ridge 31 projecting from seat 30 will indent surface 44 of valve member 43, as shown on FIG. 2, for providing a tight seal therebetween. In order to axially urger filter element 20 in the direction toward inlet passage 18 for engaging valve member 43 with seat 30, a tapering helical compression spring 47 bears, at its relatively large diameter end, against an annular magnet 48 which seats against the end wall 23 of casing 15, while the small diameter end of spring 47 seats in the circular depression 38 at the center of end wall 37 of filter element 20.

It will be apparent that, with valve member 43 engaging seat 30, that is, in the normal condition of filter device 10 according to this invention, fluid entering through inlet passage 18 is directed through axial bore 46 of valve member 43 into the interior of tube 34, and then flows radially outward through perforations 35 of tube 34 and the corrugated filtering mesh or screen 36 into annular clearance 33 so as to be effectively filtered by the mesh or screen 36. From annular clearance 33, the filtered fluid flows past magnet 48 on its way to outlet passage 19 so that magnet 48 is effective to remove from the fluid any minute ferrous particles that may be contained therein. During the foregoing normal operation of filter device 10, the force of spring 47 is sufficient to overcome the pressure differential between inlet and outlet passages 18 and 19 that acts on the depressed or indented central portion 38 of end wall 37 and that results from the resistance to flow of the fluid through the primary filter constituted by the screen or mesh 36.

However, when the primary filter constituted by the mesh or screen 36 becomes clogged with foreign particles or contaminants, the resulting increased back pressure or pressure differential between inlet and outlet passages 18 and 19 acts on the central portion 38 of end wall 37 to overcome the force of spring 47 and thereby axially displace filter element 20 in the direction for spacing valve member 43 from seat 30, as shown on FIG. 5.

Figure 3:
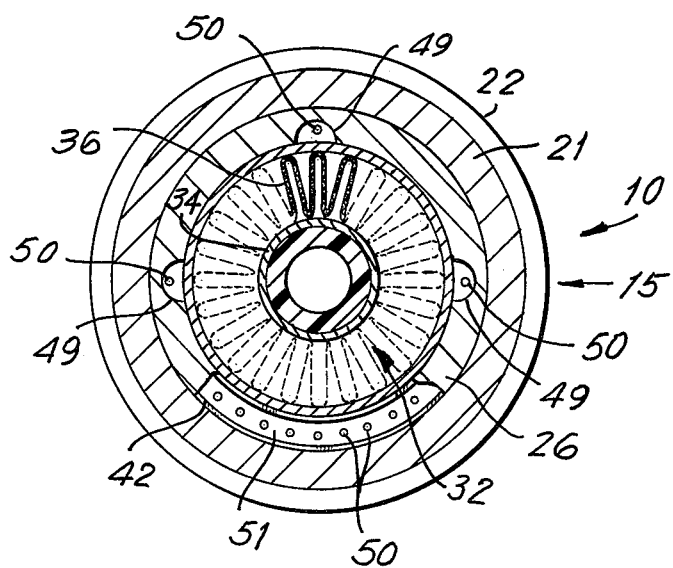
FIG. 3 is a transverse sectional view taken along the line 3—3 on FIG. 2.
Figure 4:
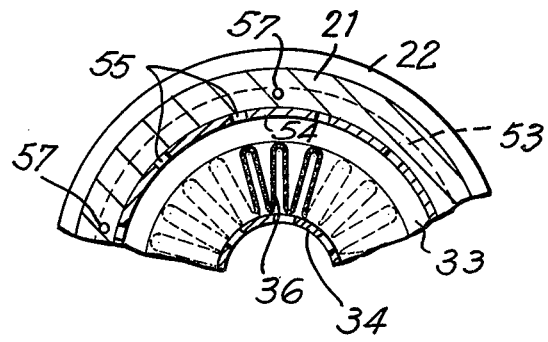
FIG. 4 is a fragmentary sectional view taken along the line 4—4 on FIG. 2.

With filter element 20 displaced to the position shown on FIG. 5 as a result of clogging of the primary filter, the fluid can flow from inlet passage 18 outwardly between valve seat 30 and the surface 44 of valve member 43 so as to enter axial grooves 49 which are formed at circumferentially spaced apart locations in the inner surface of annular wall 26 of cap 25 (FIG. 3) and which open at the free end edge of wall 26. Thus, the pressure of the fluid admitted to axial grooves 49 can act against the annulus 42 of filter element 20 for further urging the latter axially against the force of spring 47. In order to constitute a secondary filter, the annulus 42 is provided with a large number of minute bores or filtering passages 50 extending therethrough generally in the axial direction at circumferentially spaced apart locations (FIGS. 2, 3 and 5). Further, the surface of annulus 42 facing toward annular wall 26 of cap 25 is preferably formed with an annular groove 51 communicating with all of the filtering passages 51 so that the fluid conducted along axial grooves 49 of annular wall 26 will be uniformly distributed through annular groove 51 to all of the filtering passages 50.

It will be apparent that, when filter element 20 is displaced to the position of FIG. 5 for unseating valve member 43 in response to clogging of the primary filter, the fluid transmitted through axial grooves 49 will be subjected to a secondary filtration in passing through filtering passages 50 of annulus 42 into annular clearance 33 and, from the latter, the filtered fluid will flow past magnet 48 into outlet passage 19. Therefore, upon clogging of the primary filter, the flow of filtered fluid from inlet passage 18 to outlet passage 19 is maintained in order to ensure continued operation of the associated power steering system. However, in accordance with this invention, the flow capacity or flow rate through filtering passages 50 of the secondary filter is preferably selected to be substantially less than the normal flow rate through the primary filter constituted by the filter screen or mesh 36. Thus, when the primary filter becomes clogged and filter element 20 is displaced to unseat valve member 43 and thereby bypass the primary filter and initiate operation of the secondary filter, the rate of flow of the fluid through the secondary filter is substantially reduced relative to the normal flow rate of fluid through the primary filter and is detectable by the driver as a decreased power assist for the steering system. Such decreased power assist for the steering system is effective to alert the driver to the necessity for repair or servicing of the power steering system. Further, the relatively decreased flow rate through the secondary filter provides a relatively increased back pressure which, in acting on the central depressed portion 38 of end wall 37 and also on the area of annulus 42 extending across clearance 33, ensures that filter element 20 will be reliably maintained in its displaced position shown on FIG. 5 so long as the fluid is being passed through the described secondary filter. In other words, upon clogging of the primary filter and the resulting displacement of filter element 20 to the position shown on FIG. 5, the fluid entering through inlet passage 18 acts on a greater area of filter element 20 than is the case when the latter is in the position shown on FIG. 2, whereby to avoid possible fluctuation of the filter element between the positions shown on FIGS. 2 and 5, respectively, and hence to maintain a substantially uniform flow of filtered fluid, albeit at a reduced flow rate.

The filter device 10 according to this invention further preferably has means for indicating, at a location outside of the casing 15, when filter element 20 has been axially displaced for opening or unseating valve member 43 in response to clogging of the primary filter. In the illustrated embodiment of this invention, such indicating means is shown to be simply constituted by a window or port 52 of quartz or other suitably strong transparent material which is inset in side wall 21 of casing 15. The transparent window or port 52 is located so that, with filter element 20 in its normal position (FIG. 2), the annulus 42 on filter element 20 is axially displaced from window 52, whereas, when filter element 20 is axially displaced to the position shown on FIG. 5 in response to clogging of the primary filter, the periphery of annulus 42, which may be brightly colored, registers with window 52 so as to be visible therethrough.

When the fluid filter device 10 including indicating means, as described above, is incorporated in an automotive power steering system and the driver detects a decrease in the power assist of the steering action, the indicating means will readily disclose to the driver or to a mechanic whether the decrease in the power assist results from clogging of the primary filter or from some other problem in the power steering system. Of course, indicating means other than that described above with reference to FIGS. 2 and 5 may be included in filter device 10 for indicating when filter element 20 is displaced in response to clogging of the primary filter. For example, when filter element 20 is axially displaced to the position of FIG. 5, a switch may be actuated thereby for completing a circuit energizing a lamp or other indicator on the dashboard of the automotive vehicle.

In the event that the secondary filter of device 10 also becomes clogged, for example, if the driver of the automotive vehicle does not have the power steering system serviced after clogging of the primary filter is detected, as described above, or if the fluid being passed through filter device 10 contains a high concentration of foreign particles or contaminants, such as, when the automotive vehicle is being operated in an extremely dusty environment, the fluid filter device 10 according to this invention is further preferably provided with a tertiary filter through which the flow of filtered fluid is maintained to outlet passage 19. More particularly, in the illustrated fluid filter device 10, cylindrical wall 21 of casing 15 is formed with an annular cavity 53 in the inner wall surface 17 at the downstream side of annulus 42 on filter element 20. A thin cylindrical wall 54 is recessed in wall surface 17 at the inside of cavity 53, and such thin cylindrical wall 54 is formed with a number of circumferentially spaced apart slots or elongated openings 55 through which cavity 53 opens into clearance 33. A fine wire mesh or screen 56 extends about thin cylindrical wall 54 within cavity 53 to constitute the tertiary filter, and one or more bypass passages 57 are formed in casing wall 21 and each extend to annular cavity 53 from a respective port 58 opening at wall surface 16 at the upstream side of cavity 53. As is shown on FIGS. 2 and 5, each port 58 is located so as to be normally closed by the outer peripheral surface of annulus 42, that is, each port 58 is blocked by annulus 42 during normal filtration of the fluid by means of the primary filter (FIG. 2), and also during filtration of the fluid by the secondary filter constituted by annulus 42 after the primary filter has become clogged (FIG. 5). However, when the secondary filter also becomes clogged, the increased pressure differential between inlet and outlet passages 18 and 19 acting on both the central depressed portion 38 of end wall 37 and the annulus 42 of filter element 20 causes further axial displacement of the latter against the force of spring 47, for example, to the position shown on FIG. 6. With filter element 20 in the position shown on FIG. 6, the port 58 of each bypass passage 57 is uncovered so that the fluid from inlet passage 18 can enter cavity 53 through each bypass passage 57 and can exit from cavity 53 by way of the screened or filtered openings 55 for maintaining a flow of filtered fluid through annular clearance 33 past magnet 48 to outlet passage 19.

It will be apparent from the above description of a fluid filter device 10 according to this invention, that such device is effective to provide efficient normal filtration of a fluid by means of a primary filter and, upon the clogging thereof, to provide for the bypassing of such primary filter through a secondary filter, and then through a tertiary filter so as to maintain a flow of filtered fluid. By reason of the foregoing general characteristics of the fluid filter device 10, the latter is particularly adapted for use in an automotive power steering system in that it prevents malfunction of such system and thereby contributes to the safe operation of the associated automotive vehicle. Moreover, the device 10 according to this invention is effective, when included in a power steering system, to provide an indication of the clogging of its primary filter, for example, by decreasing the rate of flow of the fluid in the power steering system and thereby reducing the power assist thereof, while continuing to circulate filtered fluid for the continued safe operation of the vehicle.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A fluid filter device comprising a casing defining a chamber with a cylindrical wall surface and having an axial inlet passage terminating in an opening into said chamber at one end of the latter with a valve seat extending around said opening, and an axial outlet passage extending from said chamber at the opposite end of the latter; an elongated filter element axially movable in said chamber and including a foraminous cylindrical side wall constituting a primary filter and being spaced from said wall surface to provide an annular clearance therebetween communicating with said outlet passage, an end wall closing the filter element at the end of the latter directed toward said outlet passage, and a valve member fixed at the end of said filter element directed toward said inlet passage for engagement with said valve seat, said valve member having an axial bore through which fluid from said inlet passage can enter said filter element for normal filtration through said foraminous side wall while said valve member is engaged with said valve seat; spring means yieldably urging said filter element axially in the direction to engage said valve member with said valve seat, the force of said spring means being selected to be overcome for unseating said valve member and permitting by-passing of said primary filter when clogging of said foraminous side wall results in a predetermined buildup in the pressure differential between fluid entering at said inlet passage and fluid exiting at said outlet passage; and a secondary filter annulus extending around said filter element adjacent the end of the latter at which said valve member is fixed and slidably engaging said wall surface of the chamber so that, upon said unseating of the valve member due to clogging of said foraminous side wall, the fluid bypassing said primary filter is further filtered by said secondary filter annulus in flowing from said inlet passage to said outlet passage by way of said annulur clearance.

2. A fluid filter device according to claim 1; in which said secondary filter annulus has a reduced flow capacity relative to said primary filter constituted by said foraminous side wall.

3. A fluid filter device according to claim 1; in which said foraminous side wall is formed of a corrugated mesh.

4. A fluid filter device according to claim 1; in which said valve member and said valve seat have similar frusto-conical configurations.

5. A fluid filter device according to claim 4; in which said valve member is of a plastic resin and said frusto-conical seat has an annular ridge extending therefrom to deform the surface of the plastic resin valve member when engaged by the latter.

6. A fluid filter device according to claim 1; further comprising a magnet in said chamber adjacent said outlet passage for removing any ferrous particles from the fluid prior to said exiting of the latter through the outlet passage.

7. A fluid filter device according to claim 1; in which said elongated filter element has an imperforate, cylindrical portion extending from said foraminous side wall to said valve member, said chamber has a reduced diameter end portion adjacent said one end of the chamber to define a guide surface slidably engaged by said imperforate cylindrical portion of the filter element for axially guiding the movement of the latter, said secondary filter annulus extends radially outward from said imperforate cylindrical portion to slidably engage said wall surface of the chamber adjacent said reduced diameter end portion of the latter, and said guide surface has axially directed grooves therein through which the fluid can flow to said secondary filter annulus when said valve member is unseated.

8. A fluid filter device according to claim 7; in which said secondary filter annulus is constituted by a flange on said imperforate cylindrical portion, and said flange has filtering passages extending therethrough generally in the axial direction at circumferentially spaced apart locations.

9. A fluid filter device according to claim 8; in which the flow capacity through said filtering passages is relatively smaller than the flow capacity of said foraminous side wall, and the combined area of said end wall and said flange of the filter element is selected so that the action of the fluid thereagainst, when said valve member is unseated, is sufficient to overcome the force of said spring means and to maintain said valve member in its unseated condition.

10. A fluid filter device according to claim 1; in which said casing further has an annular cavity extending around said chamber and having openings in said wall surface at the downstream side of said secondary filter annulus considered in respect to the direction of fluid flow through said annulus when said valve member is unseated, and bypass means in said casing extending to said cavity from at least one port located in said wall surface so as to be normally closed by said secondary filter annulus so that fluid flows through said bypass means and cavity to said annular clearance for maintaining the flow to said outlet passage only when said secondary filter annulus becomes clogged and the resulting buildup of said pressure differential causes further axial displacement of said filter element against the face of said spring means.

11. A fluid filter device according to claim 10; further comprising filter means extending across said openings of the cavity for filtering the fluid that flows through said bypass means and cavity to said annular clearance.

12. A fluid filter device according to claim 1; in which said casing has fins extending from its outer surface for improved dissipation of heat therefrom.

13. A fluid filter device according to claim 1; further comprising means for indicating, at a location outside of said casing, the unseating of said valve member upon clogging of said foraminous side wall.

14. In an automotive power steering system including a power steering gear, a power steering pump, and pressure and return lines extending between said power steering gear and pump for circulating fluid therebetween: a fluid filter device interposed in one of said lines and comprising a casing defining a chamber with a cylindrical wall surface and having an axial inlet passage terminating in an opening into said chamber at one end of the latter with a valve seat extending around said opening, and an axial outlet passage extending from said chamber at the opposite end of the latter; an elongated filter element axially movable in said chamber and including a foraminous cylindrical side wall constituting a primary filter and being spaced from said wall surface to provide an annular clearance therebetween communicating with said outlet passage, an end wall closing the filter element at the end of the latter directed toward said outlet passage, and a valve member fixed at the end of said filter element directed toward said inlet passage for engagement with said valve seat, said valve member having an axial bore through which fluid from said inlet passage can enter said filter element for normal filtration through said foraminous side wall while said valve member is engaged with said valve seat; spring means yieldably urging said filter element axially in the direction to engage said valve member with said valve seat, the force of said spring means being selected to be overcome for unseating said valve member and permitting bypassing of said primary filter when clogging of said foraminous side wall results in a predetermined buildup in the pressure differential between fluid entering at said inlet passage and fluid exiting at said outlet passage; and a secondary filter annulus extending around said filter element adjacent the end of the latter at which said valve member is fixed and slidably engaging said wall surface of the chamber so that, upon said unseating of the valve member due to clogging of said foraminous side wall, the fluid bypassing said primary filter is further filtered by said secondary filter annulus in flowing from said inlet passage to said outlet passage by way of said annular clearance.

15. An automotive power steering system according to claim 14; in which said secondary filter annulus has a reduced flow capacity relative to said primary filter constituted by said foraminous side wall so that clogging of the latter is indicated to the driver by increased resistance to steering resulting from reduced circulation of the fluid between said power steering gear and pump.

16. An automotive power steering system according to claim 14; in which said foraminous side wall is formed of a corrugated mesh.

17. An automotive power steering system according to claim 14; in which said valve member and said valve seat have similar frusto-conical configurations.

18. An automotive power steering system according to claim 17; in which said valve member is of a plastic resin and said frusto-conical seat has an annular ridge extending therefrom to deform the surface of the plastic resin valve member when engaged by the latter.

19. An automotive power steering system according to claim 14; further comprising a magnet in said chamber adjacent said outlet passage for removing any ferrous particles from the fluid prior to said exiting of the latter through the outlet passage.

20. An automotive power steering system according to claim 14; in which said elongated filter element has an imperforate, cylindrical portion extending from said foraminous side wall to said valve member, said chamber has a reduced diameter end portion adjacent said one end of the chamber to define a guide surface slidably engaged by said imperforate cylindrical portion of the filter element for axially guiding the movement of the latter, said secondary filter annulus extends radially outward from said imperforate cylindrical portion to slidably engage said wall surface of the chamber adjacent said reduced diameter end portion of the latter, and said guide surface has axially directed grooves therein through which the fluid can flow to said secondary filter annulus when said valve member is unseated.

21. An automotive power steering system according to claim 20; in which said secondary filter annulus is constituted by a flange on said imperforate cylindrical portion, and said flange has filtering passages extending therethrough generally in the axial direction at circumferentially spaced apart locations.

22. An automotive power steering system according to claim 14; in which the flow capacity through said filtering passages is relatively smaller than the flow capacity of said foraminous side wall, and the combined area of said end wall and said flange of the filter element is selected so that the action of the fluid thereagainst, when said valve member is unseated, is sufficient to overcome the force of said spring means and to maintain said valve member in its unseated condition.

23. An automotive power steering system according to claim 14; in which said casing further has an annular cavity extending around said chamber and having openings in said wall surface at the downstream side of said secondary filter annulus considered in respect to the direction of fluid flow through said annulus when said valve member is unseated, and bypass means in said casing extending to said cavity from at least one port located in said wall surface so as to be normally closed by said secondary filter annulus so that fluid flows through said bypass means and cavity to said annular clearance for maintaining the flow to said outlet passage only when said secondary filter annulus becomes clogged and the resulting buildup of said pressure differential causes further axial displacement of said filter element against the force of said spring means.

24. An automotive power steering system according to claim 23; further comprising filter means extending across said openings of the cavity for filtering the fluid that flows through said bypass means and cavity to said annular clearance.

25. An automotive power steering system according to claim 14; in which said casing has fins extending from its outer surface for improved dissipation of heat therefrom.

26. An automotive power steering system according to claim 14; further comprising means for indicating, at a location outside of said casing, the unseating of said valve member upon clogging of said foraminous side wall.

* * * * *